United States Patent [19]

Dagdeviren

[11] Patent Number: 5,767,825
[45] Date of Patent: *Jun. 16, 1998

[54] ABRIDGMENT OF TEXT-BASED DISPLAY INFORMATION

[75] Inventor: Nuri Ruhi Dagdeviren, Red Bank, N.J.

[73] Assignee: Lucent Technologies Inc., Murray Hill, Del.

[ * ] Notice: The term of this patent shall not extend beyond the expiration date of Pat. No. 5,483,251.

[21] Appl. No.: 482,466

[22] Filed: Jun. 8, 1995

Related U.S. Application Data

[63] Continuation of Ser. No. 999,428, Dec. 31, 1992, Pat. No. 5,483,251.

[51] Int. Cl.$^6$ ..................................................... G09G 3/20
[52] U.S. Cl. ............................................. 345/56; 345/141
[58] Field of Search .......................... 345/56, 59, 124, 345/128, 142, 143, 144, 141, 172, 192; 371/37.1; 382/56; 379/97, 354, 396, 96; 455/158.5, 38.4, 58.1; 341/23, 22; 340/825.44, 825.5, 825.51, 825.52, 825.53; 395/769, 796, 803; 364/419.14, 419.15

[56] References Cited

U.S. PATENT DOCUMENTS

| | | | |
|---|---|---|---|
| 4,291,198 | 9/1981 | Anderson et al. | 345/168 |
| 4,394,649 | 7/1983 | Suchoff et al. | 340/711 |
| 4,932,022 | 6/1990 | Keeney | 379/96 |
| 4,949,085 | 8/1990 | Fisch et al. | 340/825.48 |
| 4,955,066 | 9/1990 | Notenboom et al. | 382/56 |
| 4,959,648 | 9/1990 | Breeden et al. | 380/825.44 |
| 4,988,991 | 1/1991 | Motegi | 340/825.44 |
| 4,994,968 | 2/1991 | Kato et al. | 395/796 |
| 5,020,058 | 5/1991 | Holden et al. | 370/109 |
| 5,072,444 | 12/1991 | Breeden et al. | 370/94 |
| 5,148,541 | 9/1992 | Lee et al. | 395/600 |
| 5,218,538 | 6/1993 | Zhang | 395/796 |
| 5,223,831 | 6/1993 | Kung et al. | 340/825.44 |
| 5,241,305 | 8/1993 | Fascenda et al. | 340/825.44 |
| 5,258,739 | 11/1993 | DeLuca | 340/825.44 |
| 5,420,973 | 5/1995 | Dagdeviren | 395/769 |
| 5,483,251 | 1/1996 | Dagdeviren | 345/56 |

*Primary Examiner*—Xiao Wu
*Attorney, Agent, or Firm*—Eugene J. Rosenthal

[57] ABSTRACT

The general problem of conveying a particular meaning in a message so that the meaning is most understandable when an abridged version of the message is displayed is solved by supplying as the message a "tagged" string in which all characters in the unabridged version of the sting are tagged with respective priority indicator each having a value indicating a particular priority level. In a station set an abridged version of the string for a particular priority level is determined by selecting all characters from the received, unabridged version having a priority indicator value equal to or greater than that particular priority level. A priority level is elected such that the corresponding abridged string fits within the available display length. In accordance with a feature of the invention, the message may further include one or more supplementary characters each also tagged with a priority indicator, and the abridged version of the string for a particular priority level includes not only the characters selected as aforesaid, but also any supplementary, characters whose priority indicator has that particular value. This, advantageously, allows the version of the string for each priority level to include characters that a) do not even appear in the unabridged version of the string, or b) arm not displayed as part of some abridged, but longer version(s) of the message, even though they appear in the unabridged version

12 Claims, 3 Drawing Sheets

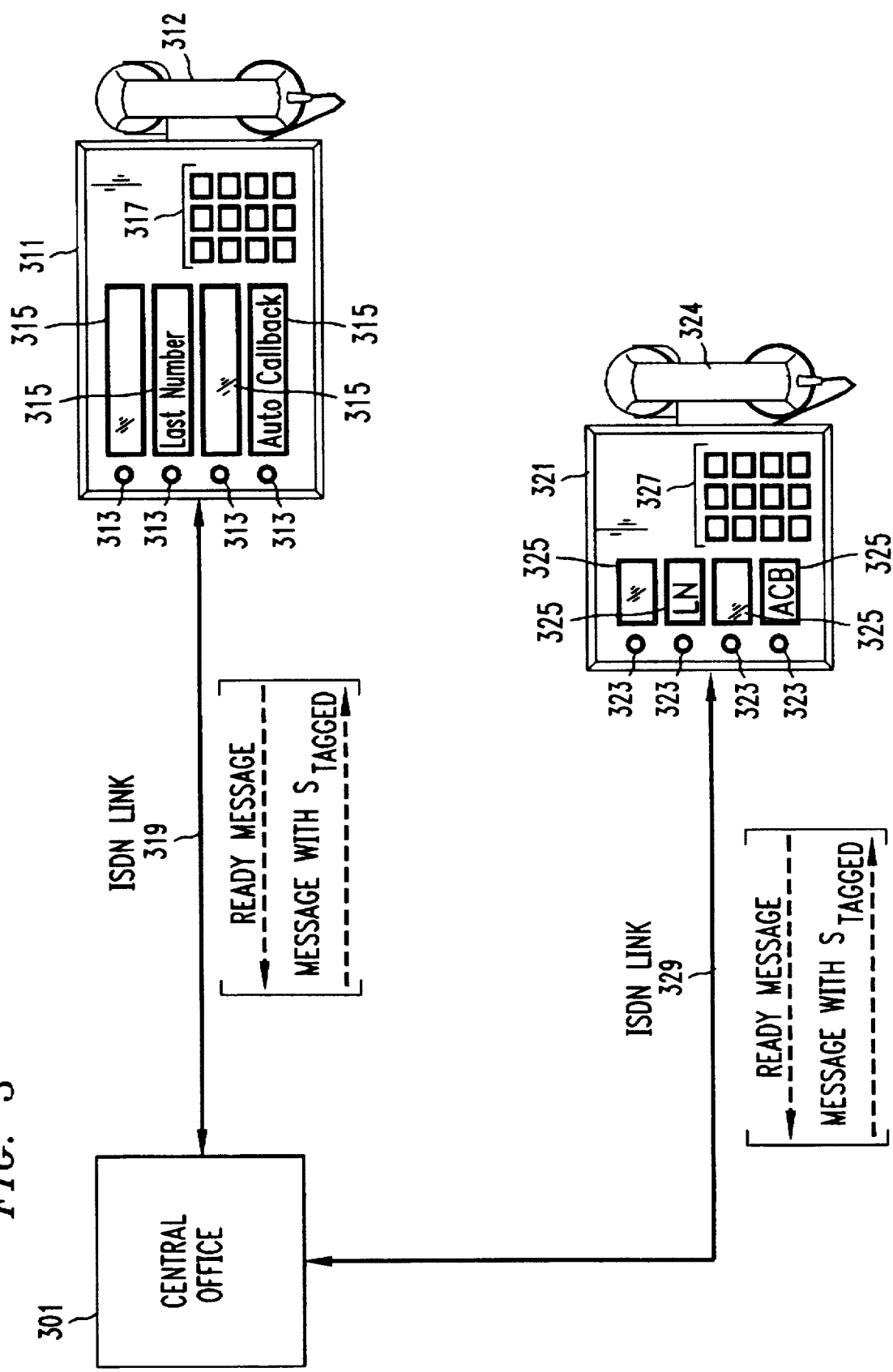

ABRIDGMENT OF TEXT-BASED DISPLAY INFORMATION

This is a continuation of application Ser. No. 07/999,428 filed Dec. 31, 1992, now U.S. Pat. No. 5,483,251

TECHNICAL FIELD

This invention relates to abridging a sting of alphanumeric characters so that the resulting abridged versions of the string will fit on displays having different lengths.

BACKGROUND OF THE INVENTION

The problem addressed by the present invention can arise in various contexts. One of these is a new generation of Integrated Services Digital Network (ISDN) telephone sets currently being developed. These sets employ softkeys, which, as is well known, are buttons that are each associated with a display label that displays an alphanumeric character string indicative of the meaning of the associated button at any particular time. Such an arrangement permits the meaning of the buttons to be changed to best suit the particular context in which the button is being used at any particular time. For such telephone sets, the meaning of any button and, the string that should be displayed on its corresponding display label are specified by a telephone switch in a telephone central office to which the set is connected.

Not all ISDN telephone sets, however, will necessarily have the same length display label for the same associated button. For example, it is expected that there will ultimately be a great number of manufacturers of ISDN telephone sets, each purveying a variety of ISDN telephone sets and featuring a range of display label lengths. The problem, then, is how to convey, from the central office to the station set, a message indicative of the meaning of a button so that a string that will fit within the particular length of the button's associated display label, and is best indicative of the intended meaning, can be displayed.

One prior art method to specify such strings to an ISDN telephone set is to fix within the ISDN telephone set itself the best version of each string to be displayed on its particular display label length. The central office sends messages indicating which meaning should be given to each button at any time and the station set retrieves and displays the corresponding stored string. Another approach is to have each ISDN telephone set identify itself by a particular classmark that indicates its capabilities, including its display label length, to the central office. Once it has the classmark, the central office knows enough information about the display label lengths of the set so that it can send strings of appropriate length for display.

Unfortunately such prior art methods require many characteristics of the ISDN system to be static and/or defined prior to developing the system and, therefore, they arm not satisfactory for use with ISDN. This is because the current expectation is that ISDN will change and evolve over time, thereby requiring new meanings and/or station set configurations while obsoleting old ones. Such evolution is antithetical to a system having many static characteristics that are defined prior to implementation. Also, there are expected to be variations among the ISDN services as they are provided by different service providers. Fixing the strings in the station set would not easily allow for such variations As a result, it is desirable that a message containing an indication of the string to display should be conveyed to the ISDN telephone set by the central office while making the station set responsible for insuring that a meaningful string is displayed within the display label without prestoring all possible strings. To do so, the prior art requires that a maximum length string, corresponding in length to a maximum label length, be developed for each meaning and conveyed, at the proper time, from the central office to an ISDN telephone set. Any station set that receives the string and cannot display it in its entirety abridges it to fit within its particular label length. One simple abridgment method is truncation, wherein all the characters that fit on the label, starting with the leftmost one, are displayed and any character that are further to the right than the last displayable character are simply dropped This is less than ideal because, generally, it is not possible to arrange a string of characters in such a way that it will read well regardless of how much of its rightmost portion is truncated. For example, the term "Auto Callback" using truncation for a label length of 8 characters would be "Auto Cal" (since spaces count as characters on a display). However, the string "Auto Cal", the eight-character truncation of "Auto Callback", provides much less intuitive information to a user than the term "Callback", which also contains 8 characters, but cannot be achieved with truncation. Similarly "Aut", the three-character truncation of "Auto Callback", is totally uninformative, as compared with "ACB", which would also fit on a 3 character display.

The dropping of vowels, another simple alternative abridgment technique, may achieve better results than truncation for certain strings. However, neither die dropping of vowels nor truncation works well in all cases.

SUMMARY OF THE INVENTION

The general problem of conveying a particular meaning in a message so that the meaning is most understandable when an abridged version of the message is displayed is solved, in accordance with the principles of the invention, by employing as the message a "tagged" string in which characters in the unabridged version of the string——illustratively all such characters——are tagged with respective priority indicators each having a value indicating a particular priority level. In a station set, an abridged version of the string for a particular priority level is determined by selecting all characters from the received, unabridged version having a priority indicator value equal to or greater than that particular priority level. A priority level is selected such that the corresponding abridged string fits within the available display length.

In accordance with a feature of the invention, the message may further include one or more supplementary characters each also tagged with a priority indicator, and the abridged version of the string for a particular priority level includes not only the characters selected a aforesaid, but also any supplementary characters whose priority indicator has that particular value. This, advantageously, allows the version of the string for each priority level to include characters that a) do not even appear in the unabridged version of the string, such as the "B" in the above-suggested three-character version of "Auto Callback", namely, "ACB", or b) are not displayed as part of some abridged, but longer version(s) of the message, even though they appear in the unabridged version such as the "A" in "ACB" which is not displayed as part of "CallBk" or "Callback", even though it is in "Auto Callback".

BRIEF DESCRIPTION OF THE DRAWING

In the drawing:

FIG. 3 shows an exemplary ISDN telephone system arrangement in which message, including ones containing a tagged string $S_{tagged}$, are exchanged for the purpose of causing labels on ISDN telephone sets to convey a particular meaning, in accordance with the principles of the invention.

DETAILED DESCRIPTION

Figure 1:
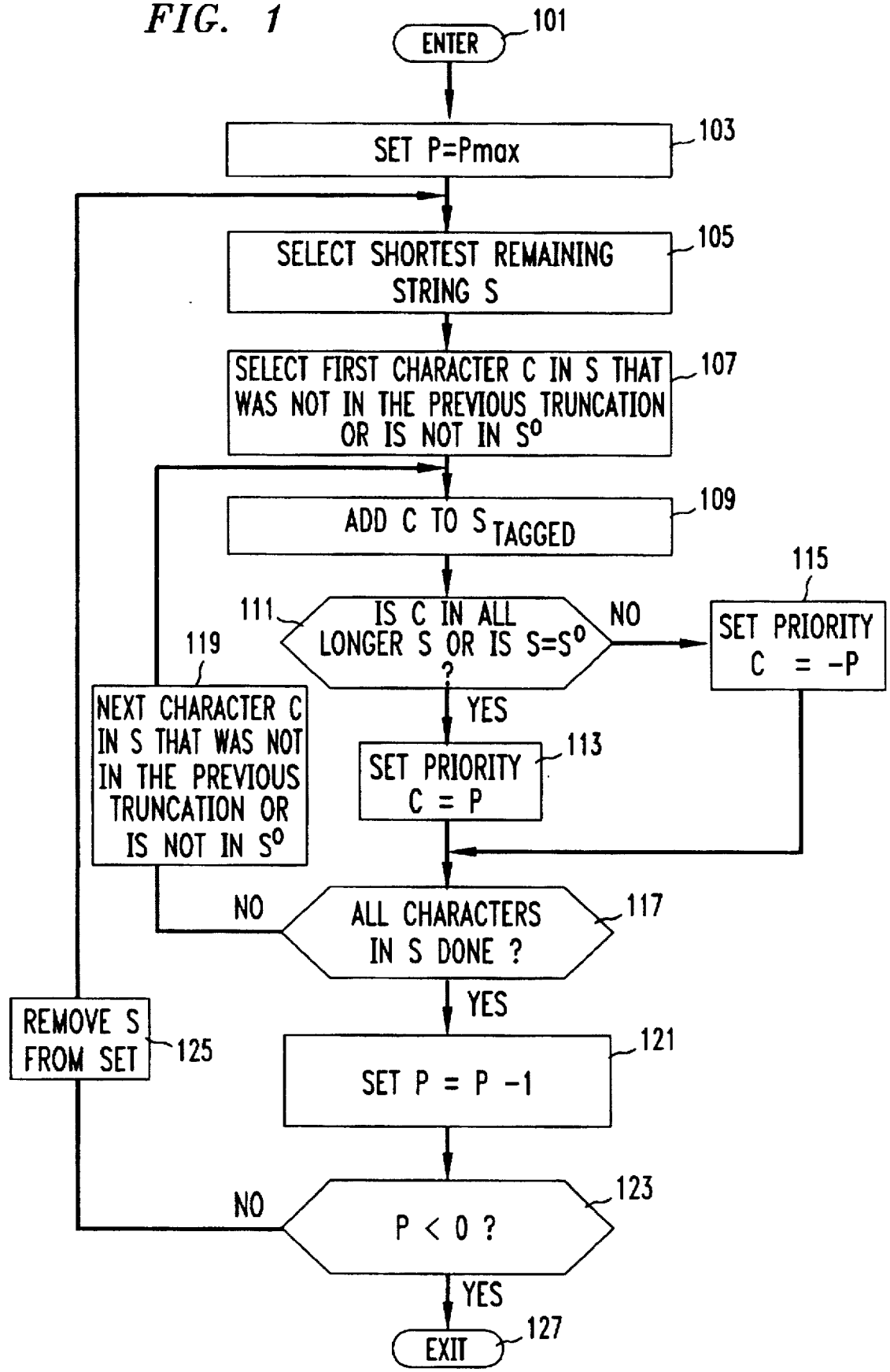
FIG. 1 shows a flowchart for developing a message which is a tagged string from which can be abridged different length strings which each convey the same meaning.

Understanding of the invention will be helped by first considering an example. Table 1 shows an exemplary tagged string $S_{tagged}$ in which each character has an associated priority indicator and an associated supplement indicator. Each priority indicator has a numeric value. Each supplement indicator has one of the two values "set", or S, and "clear", or C. Characters of the tagged string can be selectively deleted so as to yield one of four different length abridged strings each conveying the meaning "Auto Callback", in accordance with the principles of the invention. The four abridged strings are a) "Auto Callback", b) "Callback", c) "CallBk", and d) "ACB". The manner in which $S_{tagged}$ may be developed is described further below. Specifically, $S_{tagged}$ is abridged to develop any of the four strings by selecting from $S_{tagged}$ and retaining a) all characters having a priority indicator value equal to or greater than a particular priority value for which the supplement indicator is cleared, i.e., not set, and b) those characters whose priority value is equal to the particular priority value and whose supplement indicator is set. All the other characters are deleted.

TABLE 1

|  | $S_{tagged}$ | | | | | | | | | | | | | | |
|---|---|---|---|---|---|---|---|---|---|---|---|---|---|---|---|
| characters | A | A | u | t | o |   | C | a | l | l | B | B | b | a | c | k |
| priority | 3 | 0 | 0 | 0 | 0 | 0 | 3 | 2 | 2 | 2 | 2 | 3 | 1 | 1 | 1 | 2 |
| supplement | S | C | C | C | C | C | C | C | C | C | S | S | C | C | C | C |

For example, if the particular priority level is 3, the abridged string is "ACB" which is derived from $S_{tagged}$ by selecting 1) the first "A", which has a, priority indicator value of 3 and a set supplement indicator; 2) "C", having a priority indicator value of 3 and a clear supplement indicator, and 3) the second "B", which has a priority indicator value of 3 and a set supplement indicator. The corresponding columns from Table 1 are:

| characters | A | C | B |
|---|---|---|---|
| priority | 3 | 3 | 3 |
| supplement | S | C | S |

If the particular priority level is 2, the abridged string derived from $S_{tagged}$ is "CallBk" made up of 1) "Call", each character of which has a priority indicator whose value is greater than or equal to 2 and a clear supplement indicator, 2) the first "B", which has a priority indicator value of 2 and a set supplement indicator, and 3) "k" which has a priority indicator value of 2 and a clear supplement indicator. The corresponding columns from Table 1 arm:

| characters | C | a | l | l | b | k |
|---|---|---|---|---|---|---|
| priority | 3 | 2 | 2 | 2 | 2 | 2 |
| supplement | C | C | C | C | S | C |

For a particular priority level of 1 the characters selected from $S_{tagged}$ are 1) "Call", each character of which has a priority indicator whose value is greater than or equal to 1 and a clear supplement indicator, and 2) "back", for which each character also has a priority indicator whose value is greater than or equal to 1, to yield the abridged string "Callback". The corresponding columns from Table 1 are:

| characters | C | a | l | l | b | a | c | k |
|---|---|---|---|---|---|---|---|---|
| priority | 3 | 2 | 2 | 2 | 1 | 1 | 1 | 2 |
| supplement | C | C | C | C | C | C | C | C |

The maximum length abridged string, "Auto Callback" is obtained for a particular priority level of 0. The characters selected are all those whose supplement indicator is not set. The corresponding columns from Table 1 are:

| characters | A | u | t | o |   | C | a | l | l | b | a | c | k |
|---|---|---|---|---|---|---|---|---|---|---|---|---|---|
| priority | 0 | 0 | 0 | 0 | 0 | 3 | 2 | 2 | 2 | 1 | 1 | 1 | 2 |
| supplement | C | C | C | C | C | C | C | C | C | C | C | C | C |

FIG. 1 shows a flowchart of an exemplary process for developing a tagged string $S_{tagged}$ such is that shown in Table 1. Attention is first directed, however, to FIG. 2.

Figure 2:
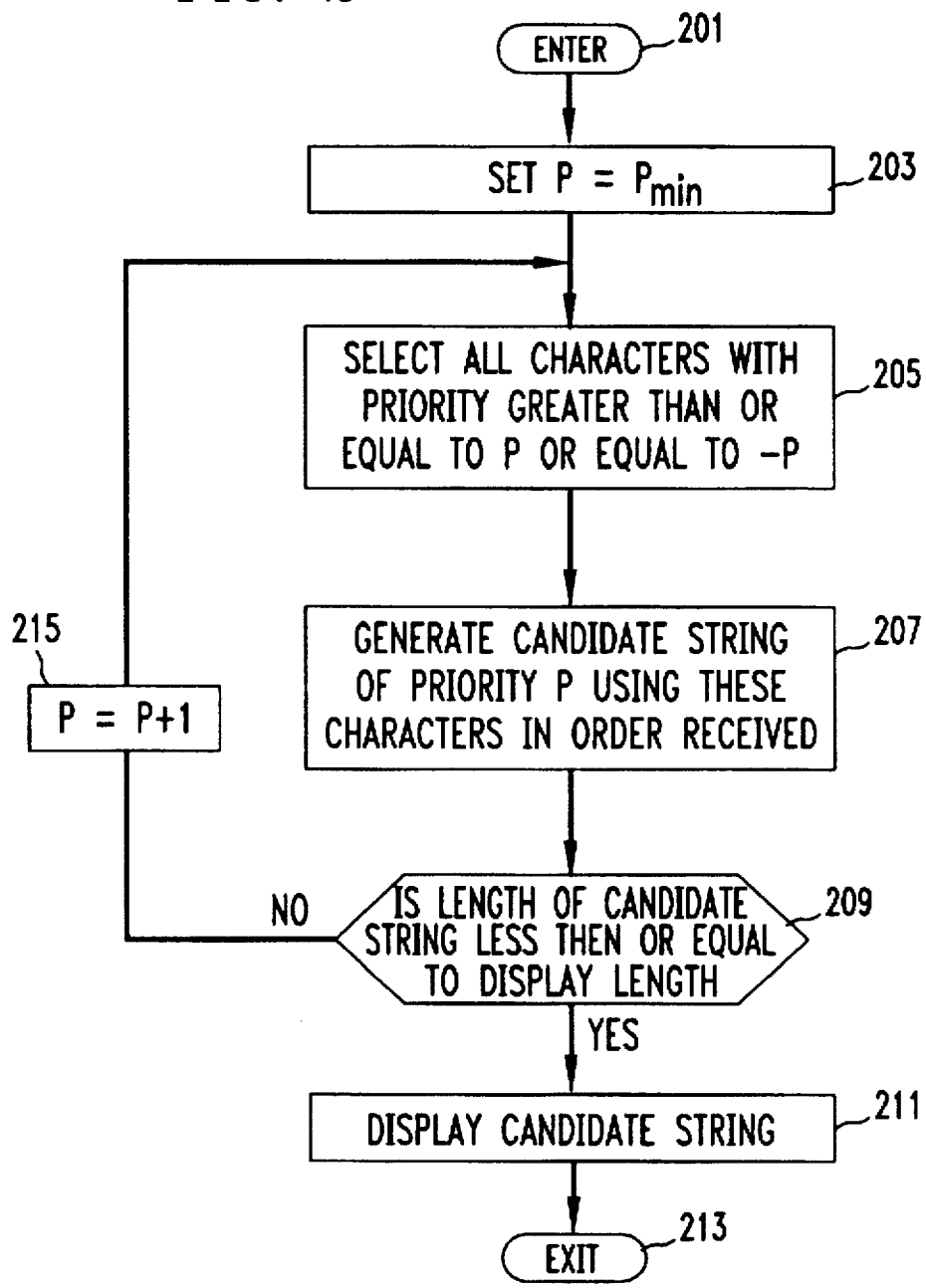
FIG. 2 shows a method, for use by a station set for abridging a received tagged string to develop a string that can be displayed within the number of characters available at the station set, for displaying the message received in $S_{tagged}$.

In particular, FIG. 2 shows an exemplary process, for use by a station set, for abridging a received tagged string $S_{tagged}$ to develop a string that can be displayed within the number of characters available at the station set in order to display the message received in $S_{tagged}$. For this example, it is assumed that each character has an overall priority indicator that is a combination of the priority and supplement indicators in the form of a signed number whose magnitude is the priority indicator and whose sign is the supplement indicator with + (−) indicating a non-set (set) indicator associated with a non-supplementary (supplementary) character.

The process is entered, in step 201, upon receipt of $S_{tagged}$. Next, in step 203, P, a variable indicating a current "candidate" priority value, is set to $P_{min}$, the lowest priority value, e.g. 0. It is noted that the lower the priority value used, the longer will be the resulting string. Thereafter, in accordance with the principles of the invention, all characters in $S_{tagged}$ the value of whose overall priority indicator is a) greater than or equal to P or b) equal to −P are selected. In step 207, a candidate abridged string for display is developed using the characters selected in step 205. The characters are arranged in the same order that they appeared in $S_{tagged}$.

Next, conditional branch point 209 tests to determine if the length of the candidate abridged string is less than or equal to the length of the display on which the string is to be displayed. If the test result in step 209 is YES, indicating that the candid abridged string will fit on the display, control passes to step 211 and the candidate abridged string is displayed. The process is then exited in step 213. If the test result in step 209 is NO, indicating that the candidate abridged string will not fit on the display, control passes to step 215, in which the candidate priority value P is incremented. Control then passes back to step 205 and the process continues as described above to develop a new candidate abridged string.

Looking now at the exemplary process for developing a tagged string $S_{tagged}$ depicted in FIG. 1, it is to be noted that before $S_{tagged}$ can be developed each of the abridged strings——e.g., in the above example a) "Auto Callback", b) "Callback", c) "CallBk", and d) "ACB" ——must be known. The abridged strings should be selected by a human factors analyst so that each best conveys the intended meaning for a string of its particular display length.

The strings selected to be incorporated into each string $S_{tagged}$ are processed together as a set. When all the characters of a string have been incorporated into the tagged string $S_{tagged}$, so that characters of that string requires no further processing, the string is said to be removed from the set. All strings that have characters that must still be incorporated into $S_{tagged}$ are said to remain in the set.

In the embodiment of FIG. 1, as in the embodiment of FIG. 2, the priority indicator and the supplement indicator are combined to produce an overall priority indicator, which is a signed number, i.e., a number having a magnitude and a sign bit that indicates if the number is positive or negative. The magnitude of the signed number is used as the priority indicator and the setting of the supplement indicator is represented by setting the sign bit, which makes the overall priority indicator for supplement characters a negative value. Conversely, the clearing of the supplement indicator is represented by clearing the sign bit, which makes the priority indicator for supplement characters an overall positive value.

The process is entered in step 101 when a string for transmission is to be constructed. In step 103, P, a temporary variable indicating a priority value to currently be used as the value of the priority indicators of the characters to be next processed, is set to $P_{max}$, the highest priority value. In this example, the priority values range from 0, the lowest, to $P_{max}$, the highest, which is equal to the number of selected strings minus one. In step 105, S, the string currently being incorporated into tagged string $S_{tagged}$ is set to the shortest remaining string in the set. Next, in step 107, the first character C from one end, e.g., leftmost, is selected that either 1) is not found in the string immediately previously removed from the set, or 2) is not found in the maximum length abridged string, $S_0$. C is then added to the character portion of $S_{tagged}$, in step 109, to the right of any characters that are to the left of C'S position in S that have already been added to $S_{tagged}$.

Conditional branch point 111 tests to determine a) if C is present in all the other strings that are still in the set, which are all longer than current string S, or b) if S is identical to $S_o$. If the test result in step 111 is YES, thus indicating that character C is not a supplementary character, control passes to step 113, in which the overall priority indicator of character C is set to the value of P, the current priority value. Thus, the character is marked for deletion with a priority value of P. If the test result in step 111 is NO, this indicates that character C is an "supplementary character", i.e., one that would not be available for deletion from the string in the set next longer than S. Therefore, control passes to step 115, in which the overall priority indicator of the character C is set to the negative of the value of P, the current priority value. Doing so corresponds to marking the character for deletion with a priority value of P and setting the supplement indicator for the character.

After completion of step 113 or 115, control passes to conditional branch point 117, which tests to determine if all the characters in current string S have been processed. If the test result in step 117 is NO, indicating that there remains additional unprocessed characters in the current string S, control passes to step 119, in which the value of C is set to the next endmost unprocessed character in current string S. Control then passes back to step III and the process continues as described above. If the test result in step 117 is YES, indicating that there are no unprocessed characters remaining in S, control passes to step 121, in which the current priority value P is decremented.

Conditional branch point 123 next tests to determine if the value of P is less than 0. If the test result in step 123 is NO, indicating there remain additional priority levels, control passes to step 125, in which the current string S is removed from the set. Control then passes back to step 105 and the process continues as described above. If the test result in step 123 is YES, indicating that all the strings have been processed, control passes to step 127 and the process is exited.

As an example, it will be shown how 4 different length strings are inched into a single tagged string $S_{tagged}$ for the meaning "Auto Callback" using the method of FIG. 1. The strings selected for the set arm those noted above, namely, a) "Auto Callback"; b) "Callback"; c) "CallBk"; and d) "ACB". There are 4 different priority levels, each having a value between 0 and 3, with 0 being the lowest priority level $P_{min}$ and 3 being the maximum $P_{max}$. Again, for this example, the maximum length string $S^o$ is "Auto Callback".

In step 103, P is set to 3, the highest priority level. S is set to "ACB", the shortest of the selected strings, in step 105. Since the process is just beginning, no characters have been added to $S_{tagged}$. Therefore, "A", the leftmost character of "ACB", is selected in step 107 and add to the character portion of $S_{tagged}$ in step 109. The character portion of $S_{tagged}$ now contains "A". Since "A" is not in either "Callback" or "CallBk", nor is S identical to the maximum length string, $S^o$, the test result in conditional branch point 111 is NO and control passes to step 115 which assigns a value of −3 to the overall priority indicator for "A" in $S_{tagged}$. The test result in step 117 is NO, because there remains in S the characters "CB" that have not yet been processed Therefore, control passes to step 119 in which the next unprocessed character remaining in S, "C", is selected as C, the current character to be processed.

"C" is added to the character portion of $S_{tagged}$ which now contains "AC". Since "C" is in "Auto Callback", "Callback" and "CallBk", the test result in, conditional branch point 111 is YES, and control passes to step 113, which places a value of 3 in the overall priority indicator for "C" in $S_{tagged}$. The test result in step 117 is NO, because "B" remains in S and has not yet been processed Therefore, control passes to step 119 in which the next unprocessed remaining character in S, "B", is selected as C, the current character to be processed.

"B" is added to the character portion of $S_{tagged}$ which now contains "ACB". Since "B" is not in either "Auto Callback" or "Callback", nor is S the maximum length string, So, the test result in conditional branch point 111 is NO, and control passes to step 115 which places a value of −3 in the overall priority indicator for "B" in $S_{tagged}$. The test result in step 117 is YES, because all the characters of S that have been processed. Therefore, control passes to step 121 which decrements the current priority level P to a new value of 2. Because 2 is greater than 0, the test result in step 123 is NO, and control passes to step 125, which removes "ACB" from the set.

S is set to "CallBk", the shortest remaining abridgment, in step 105. "C", the leftmost character of "CallBk", was already added to $S_{tagged}$ with an overall priority indicator of 3, i.e., without its supplement indicator being set Therefore, "a", the next leftmost character of "CallBk" that was not already added to $S_{tagged}$, is selected in step 107 and added to $S_{tagged}$ in step 109. The character portion of $S_{tagged}$ now contains "ACaB". Since "a" is in "Auto Callback" and "Callback"——the strings remaining in the set that are longer than the current string "CallBlk"——the test result in conditional branch point 111 is YES, control passes to step 113. In step 113 a value of 2 is placed in the overall priority indicator for "a" in $S_{tagged}$. The test result in step 117 is NO, because there remains in current string S the characters "llBk" that have not yet been processed. Therefore, control passes to step 119 in which the next character in S, "l", is selected as C, the current character to be processed.

The process continues as described above, adding the characters "ll", and overall priority indicators for them to $S_{tagged}$, so that the character portion of $S_{tagged}$ now contains "ACallB". Since the next character in S, "B", is not in maximum length string $S^o$, even though it was in the previous abridgment "ACB", it is selected as C in step 107 and added to the character portion of $S_{tagged}$ in step 109. The character portion of $S_{tagged}$ now contains "ACallBB". Since "B" is not in either "Auto Callback" or "Callback", nor is S the maximum length string. So, the test result in conditional branch point 111 is NO, and control passes to step 115, which places a value of −2 in the overall priority indicator for "B". The test result in step 117 is NO, because the character "k" remains in S and has not yet been processed.

The process continues as described above, first adding "k" to $S_{tagged}$ with an overall priority indicator value of 2 and then, at the next lower priority level, adding the characters "bac", each with an overall priority indicator value of 1, to $S_{tagged}$. Then, the priority level is decremented to 0 and the string "Callback" is removed from the set. The character portion of $S_{tagged}$ now contains "ACallBBack".

S is set to "Auto Callback", the only abridgment remaining in the set, which is also the maximum length string $S^o$, in step 105. Since the next character "A" was not in the previously processed string "Callback", it is selected as C in step 107 and is added to char portion of $S_{tagged}$ in step 109. The character portion of $S_{tagged}$ now contains "AACallBBback". Since the current string S is also the maximum length string $S^o$, the test result in conditional branch point 111 is YES, and control pies to step 113, which places a value of 0 in the overall priority indicator for "A". The test result in step 117 is NO, because characters "uto Callback" remain in S and have not yet been processed. Therefore, control passes to step 119, in which the next character in S, "u", is selected as C, the current character to be processed.

The process continues as described, adding characters "uto " to $S_{tagged}$, each having an overall priority indicator value of 0. When P is decrement in step 121 its value becomes −1. Therefore, the test result in step 123 is YES and the process exits via step 127.

Table 2 shows the resulting $S_{tagged}$, which is equivalent to that shown in Table 1. The same priority values in decimal, as in Table 1, are listed below the character. The supplement indicator, as represented by the sign of each character, is also shown. Again, it is noted that a negative sign corresponds to a set supplement indicator and a positive sign corresponds to a cleared supplement indicator, in accordance with an aspect of the invention. Also listed is the priority value expressed as a binary number, where the uppermost bytes are the $2^1$ value for each character and the lowermost bytes are the $2^0$ values. The sign bit expressed in binary is also shown, with a 1 corresponding to a positive sign (+) and a 0 corresponding to a negative sign (−). The characters are divided into 2 groups of 8 characters each, with the groups being separated by a gap, so that the binary information is grouped into octets.

TABLE 2

| Characters | A | A | u | t | o |   | C | a | l | l | B | B | b | a | c | k |
|---|---|---|---|---|---|---|---|---|---|---|---|---|---|---|---|---|
| sign | − | + | + | + | + | + | + | + | + | + | − | − | + | + | + | + |
| Priority | 3 | 0 | 0 | 0 | 0 | 0 | 3 | 2 | 2 | 2 | 2 | 3 | 1 | 1 | 1 | 2 |
| sign | 0 | 1 | 1 | 1 | 1 | 1 | 1 | 1 | 1 | 1 | 0 | 0 | 1 | 1 | 1 | 1 |
| priority | 1 | 0 | 0 | 0 | 0 | 0 | 1 | 1 | 1 | 1 | 1 | 1 | 0 | 0 | 0 | 1 |
| (binary) | 1 | 0 | 0 | 0 | 0 | 0 | 1 | 0 | 0 | 0 | 0 | 1 | 1 | 1 | 1 | 0 |

Table 3 shows only the tag portion of $S_{tagged}$ as it might appear in an ISDN message. The escape code and escape type fields combine to indicate that the following information is tag information and the length field indicates that there are 6 octets of tag information. The tag information of the overall priority indicators is that from Table 2 arranged by scanning the octets from left to right and placing each octet scanned below the previously scanned one.

TABLE 3

| bit position | 8 | 7 | 6 | 5 | 4 | 3 | 2 | 1 |
|---|---|---|---|---|---|---|---|---|
| escape code | 1 | 0 | 1 | 1 | 1 | 1 | 1 | 1 |
| escape type | 0 | 1 | 0 | 0 | 0 | 1 | 1 | 0 |
| length = 6 | 0 | 0 | 0 | 0 | 0 | 1 | 1 | 0 |
| priority | 0 | 1 | 1 | 1 | 1 | 1 | 1 | 1 |
| indicators | 1 | 1 | 0 | 0 | 1 | 1 | 1 | 1 |
|  | 1 | 0 | 0 | 0 | 0 | 0 | 1 | 1 |
|  | 1 | 1 | 1 | 1 | 0 | 0 | 0 | 1 |
|  | 1 | 0 | 0 | 0 | 0 | 0 | 1 | 0 |
|  | 0 | 0 | 0 | 1 | 1 | 1 | 1 | 0 |

FIG. 3 shows an exemplary ISDN telephone system arrangement in which messages, including ones containing a tagged string $S_{tagged}$, are exchanged for the purpose of causing labels on ISDN telephone sets to convey a particular meaning, in accordance with the principles of the invention. Shown are central office 301 and ISDN telephone sets 311 and 321, interconnected in the manner shown by ISDN links 319 and 329, respectively. ISDN telephone set 311 includes a) handset 312, b) buttons 313, each associated with a respective one of display labels 315, and c) keypad 317. Display labels 315 are each 13 characters long. Similarly, ISDN telephone set 321 includes a) handset 322, b) buttons 323, each associated with a respective one of display labels 325, and c) keypad 327. Display labels 325 are each 3 characters long.

ISDN links 319, 329 carry messages between central office 301 and ISDN telephone sets 311, 321. Exemplary messages passing over ISDN links 319, 329, depicted in FIG. 3, include a) ready messages 3191, 3291, e.g., messages indicating that the ISDN set is available to communicate with the central office, and b) messages including tagged strings $S_{tagged}$ 3192, 3292, e.g., messages that specify a meaning and for which ISDN telephone sets 311, 321 should display a string that best conveys that meaning in one of display labels 315, 325, in accordance with the principles of the invention. Messages including a tagged string $S_{tagged}$ 3192, 3292 are generated by central office 301 in response to a label mission command signal, which is generated within central office 301 when the meaning of a display label is to be conveyed to one of ISDN telephone sets 311, 321. Such a label transmission command signal may be developed without external stimulus such as in response to a scheduled system interrupt. Alternatively, the label transmission command signal may be developed in response to receipt of a signal from an ISDN telephone set indicating its readiness to receive messages that specify meanings for its display labels. Such a signal from an ISDN telephone set may be any valid message from the ISDN telephone set that is indicative of the presence of a functioning ISDN telephone set connected to the central office. Or, it may be a signal indicating specifically that the ISDN telephone set is presently ready to receive a message containing a meaning for a display label and that such a message should be the next message transmitted.

If ISDN telephone sets 311, 321 are identical except for the lengths of their respective display labels 315, 325, then the sending to each of an identical set of messages by central office 301, i.e., messages containing the same tagged strings, will result in each one of display labels 315 displaying a string conveying the same message as is displayed on a similarly positioned one of display labels 325. An advantage of the invention is that it permits the central office to transmit meaningful, display information to an ISDN station set despite the fact hat it has not received any message from the ISDN station set or even knowing if a station set is connected Such "blind" transmission is contemplated in an envisioned ISDN broadcast mode.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A method comprising the steps of:
   receiving a tagged string that includes characters and a priority indicator for each character, said priority indicators for at least two of said characters having different values; and
   selecting those characters of said received tagged string the value of whose priority indicator is greater than or equal to a particular value.

2. The invention as defined in claim 1 further including the step of:
   displaying said selected characters on a display having a predetermined length if said selected characters fit within the predetermined length of said display.

3. The invention as defined in claim 1 further including the step of:
   displaying said selected characters on a display in the same order as they appear in said received tagged string.

4. The invention as defined in claim 1 wherein each of said characters also has a supplement indicator and wherein in said selecting step only characters whose supplement indicators have a first value and whose priority indicator is greater than or equal to a particular value are selected, the method further including the step of:
   selecting those characters of said received tagged string whose supplement indicator has a second value and whose priority indicator is equal to said particular value.

5. The invention as defined in claim 4 wherein said priority indicator and said supplement indicator are combined into an overall priority indicator that is a signed number in which said supplement indicator is the sign bit of said signed number and said priority indicator is the magnitude of said signed number.

6. The invention as defined in claim 4 further including the step of:
   displaying said selected characters on a display having a predetermined length if said selected characters fit within the predetermined length of said display.

7. A method for use in displaying on a predetermined length display an abridged version of a tagged string, said tagged string including characters and a numerical priority indicator for each character, said priority indicators for at least two of said characters having different values, the method comprising the steps of:
   selecting all characters of said tagged string the value of whose priority indicator is greater than or equal to a predetermined value, said predetermined value being such that said characters selected fit within said predetermined length display; and
   displaying said characters on said display.

8. The invention as defined in claim 7 wherein said predetermined value is such at said characters selected are the maximum length abridged version said tagged string that will fit within said predetermined length display.

9. A method for use in displaying on a predetermined length display an abridged version of a tagged string, said tagged string including characters as well as a numerical priority indicator and a supplement indicator for each character, said priority indicators for at least two of said characters having different values, the method comprising the steps of:
   selecting those characters of said tagged string the value of whose priority indicator is greater than or equal to a predetermined value and whose supplement indicator is not set and those characters the value of whose priority indicator is equal to said predetermined value and whose supplement indicator is set, said predetermined value being selected such that said characters selected fit within said predetermined length display; and
   displaying said selected characters on said display.

10. The invention as defined in claim 9 wherein said predetermined value is such that said characters selected are the maximum length abridged version of said tagged string that will fit within said predetermined length display.

11. A method comprising the step of forming a new string of characters from received characters and received priority indicators associated with each of said received characters, said received priority indicators for at least two of said received characters having different values, said forming being effectuated by selecting those received characters the value of whose associated received priority indicator is greater than or equal to a particular value.

12. A method comprising the step of generating a new string of characters from received characters and received priority indicators associated with each of said received characters, said received priority indicators for at least two of said received characters having different and immutable values and being information distinct from said received characters, said generating being effectuated by selecting those received characters the value of whose associated received priority indicator is greater than or equal to a particular value.

* * * * *